United States Patent
Martens et al.

(10) Patent No.: US 8,880,039 B2
(45) Date of Patent: Nov. 4, 2014

(54) METHOD AND APPARATUS FOR INTELLIGENTLY COMPOSING A MULTIMEDIA MESSAGE FOR A MOBILE RADIO SYSTEM

(75) Inventors: Robert Martens, Holm (DE); Jan Martens, Hamburg (DE)

(73) Assignee: Speech Design Gesellschaft fur Elektronische Sprachverarbeitung mbH (DE)

( * ) Notice: Subject to any disclaimer, the term of this patent is extended or adjusted under 35 U.S.C. 154(b) by 240 days.

(21) Appl. No.: 13/139,689

(22) PCT Filed: Dec. 8, 2009

(86) PCT No.: PCT/EP2009/008770
§ 371 (c)(1),
(2), (4) Date: Jun. 14, 2011

(87) PCT Pub. No.: WO2010/072328
PCT Pub. Date: Jul. 1, 2010

(65) Prior Publication Data
US 2011/0244834 A1    Oct. 6, 2011

(30) Foreign Application Priority Data

Dec. 15, 2008    (DE) .......................... 10 2008 062 300

(51) Int. Cl.
*H04M 11/10*    (2006.01)
*H04M 3/42*    (2006.01)
(Continued)

(52) U.S. Cl.
CPC ............ *H04M 3/533* (2013.01); *H04M 3/4878* (2013.01); *H04M 3/42348* (2013.01); *H04W 4/12* (2013.01); *H04M 2201/60* (2013.01); *H04M 2203/4518* (2013.01); *H04M 3/53333* (2013.01); *H04M 2201/40* (2013.01); *H04M 3/5307* (2013.01); *H04M 3/537* (2013.01); *H04M 3/42382* (2013.01)

USPC .......................... 455/413; 455/187.1; 370/516

(58) Field of Classification Search
CPC ..... H04W 24/00; H04W 48/20; H04W 40/12; H04L 51/04; G06Q 40/00
USPC ........ 455/187.1, 450, 422.1, 404.2, 413, 410; 379/88.13; 370/516; 709/203
See application file for complete search history.

(56) References Cited

U.S. PATENT DOCUMENTS

| 2003/0123622 A1* | 7/2003 | Gifford et al. ............. 379/88.13 |
| 2007/0266101 A1* | 11/2007 | Patel et al. .................... 709/206 |
| 2008/0215746 A1* | 9/2008 | Agarwal et al. ............... 709/231 |

FOREIGN PATENT DOCUMENTS

| DE | 603 02 627 | 8/2006 |
| WO | WO 2004/054220 | 6/2004 |

(Continued)

OTHER PUBLICATIONS

PCT International Search Report corresponding to PCT Application PCT/EP2009/008770 filed Dec. 8, 2009 (7 pages).

(Continued)

*Primary Examiner* — Kiet Doan
(74) *Attorney, Agent, or Firm* — Wolff & Samson, PC

(57) ABSTRACT

The invention presently proposed relates to a method and an apparatus for intelligently composing a multimedia message for a mobile radio system. In this method, a digital voice message is received from a digital answering service, a blank multimedia message is generated and the received multimedia message is added, the available amount of data remaining in the multimedia message is calculated, the digital voice message is analyzed, and a suitable multimedia content is selected in dependence on the remaining available amount of data in the multimedia message and the analysis result, and finally the multimedia content thus selected is added to the multimedia message including the received digital voice message.

12 Claims, 6 Drawing Sheets

(51) Int. Cl.
*H04M 3/533* (2006.01)
*H04M 3/53* (2006.01)
*H04M 3/537* (2006.01)
*H04M 3/487* (2006.01)
*H04W 4/12* (2009.01)

(56) References Cited

FOREIGN PATENT DOCUMENTS

| WO | WO 2004/095422 | 11/2004 |
|---|---|---|
| WO | WO 2008/084207 | 7/2008 |

OTHER PUBLICATIONS

Written Opinion of the International Searching Authority corresponding to PCT Application PCT/EP2009/008770 filed Dec. 8, 2009 (7 pages).

English Translation of the Written Opinion of the International Searching Authority corresponding to PCT Application PCT/EP2009/008770 filed Dec. 8, 2009 (5 pages).

* cited by examiner

METHOD AND APPARATUS FOR INTELLIGENTLY COMPOSING A MULTIMEDIA MESSAGE FOR A MOBILE RADIO SYSTEM

The present invention relates to a method and an apparatus for intelligently composing a multimedia message of different multimedia contents for a mobile radio system.

Digital answering machine systems—so-called digital voice boxes or voice mailboxes—allowing to leave digital voice messages—hereinafter also referred to as voice mails—for the event that the telephone subscriber can not be reached, represent one of the most important services in modern mobile telephony. The digital voice box usually is a large database entertained by a mobil radio provider (carrier) who centrally stores the digital voice messages for the respective subscriber.

A mobile telephone subscriber wishing to check his/her voice mailbox establishes a voice connection with the carrier and is replayed the respective voice mails in the order of their arrival by the voice mail system via the voice connection. Estimates say that five to six percent of the entire mobile voice traffic are being used for checking the voice mailboxes. As the installation and provision of a voice mailbox is a service that is generally offered free of cost by the mobil radio provider amid to a tough competition, the voice traffic turnovers otherwise achievable are lost to the provider.

As far as the mobil radio provider is concerned, the presently existing voice mail system moreover presents the drawback of having to entertain large databases so as to be able to provide a sufficient data volume for the subscribers' voice messages.

But this conventional voice mail system also presents drawbacks for the telephone subscribers. All voice mails for a subscriber must be stored in the order of their arrival, so that, as a rule, the telephone subscriber must also listen to or at least retrieve any previous voice mails in their order of succession. He/She does, however, not have the option of specifically selecting an actually important voice message from the voice mails kept in store for him/her. If, for instance, the subscriber is awaiting an important reply call while having been unable to reach for a certain time period, it is extremely laborious for him/her to first have to struggle through all the voice mails of other calls that are less important.

There is accordingly a demand for a fundamental improvement of the existing voice mail system of mobile mobil radio providers. To this end, an innovative new concept for the digital answering service has been found in the "Voice Mail to MMS" concept which exploits the meanwhile enormous capabilities of modern mobile telephone sets. In difference from the old voice mail system, the voice mails are forwarded to the telephone subscriber in push operation in the new voice mail system. This means that the received voice mails need not await to be retrieved by a call on the part of the telephone subscriber, but following their arrival they are automatically forwarded by the mobil radio provider to the subscriber's mobile telephone set in the form of a standardized multimedia message, e.g. in the MMS format, as soon as the mobile telephone set is ready to receive. The voice mail received as an MMS (i.e., the digital voice message from the digital answering service) may then be readily be reproduced by an internal MMS player on the mobile telephone set.

As the digital voice messages are already stored in the mobile telephone set instead of first being transmitted upon inquiry as a "call" by the mobil radio provider via the voice channel, it is possible for a list of callers to be displayed on the display of the mobile telephone. The mobile telephone subscriber may then conveniently select the messages most important to him/her on the display of his/her mobile telephone set from a displayed list. If the caller's number is stored in the directory of the mobile telephone set, it is possible to display not only the number but at the same time also the name of the caller, which serves to further improve the user friendliness of "Voice Mail to MMS."

In this context it is advantageous to the mobil radio provider that MMS is transmitted not via a voice channel but a data channel, thus decreasing the load on the voice channel. Accordingly, this amounts on the one hand to a reduced burden on the frequency bandwidth purchased by the mobil radio provider, and on the other hand to a better rate of utilization of the bandwidth for data channels which had hitherto rather been used less.

Basically, however, an MMS offers the possibility of transmitting not only digital voice messages of a voice mailbox but also visual or audio-visual data—so-called multimedia content. "Voice Mail to MMS" thus allows to send multimedia messages which may contain digital voice messages and in addition multimedia contents such as, e.g., images, presentations, animations, or video clips, in the standardized MMS format.

As modern mobile telephone sets in the meantime possess comparatively large, high-quality displays, and a telephone subscriber only listens to a digital voice message played to him/her, a telephone subscriber making use of the mobil radio provider's "Voice Mail to MMS" is enabled to note the visual multimedia contents offered in parallel. Even audio-visual multimedia contents are feasible as long as replaying the audio contents does not temporally coincide with the reproduction of the digital voice message proper.

This opens up entirely new possibilities of integrating additional visual or audio-visual information that is of interest to the telephone subscriber or mobil radio provider, in the framework of the digital answering service that utilizes digital voice messages transmitted per MMS. A mobile telephone subscriber making use of this novel digital answering service will, however, not wish to be pestered at random by additional multimedia contents but will only have an interest in multimedia contents that convey information personally relevant to him/her. Vice versa, the intelligent integration of additional multimedia contents is equally important to the providers of multimedia contents. The data transfer volume additionally generated by a more appealing digital answering service ultimately is also more profitable for a carrier offering such service for his mobile radio system.

These novel possibilities accordingly give rise to the object of how to specifically integrate additional information possibly of interest to the telephone subscriber in the MMS including the digital voice message.

This object is achieved through the method and the apparatus according to claims 1 and 8. Further advantageous aspects and developments are subject matter of the appended subclaims.

Figure 1:
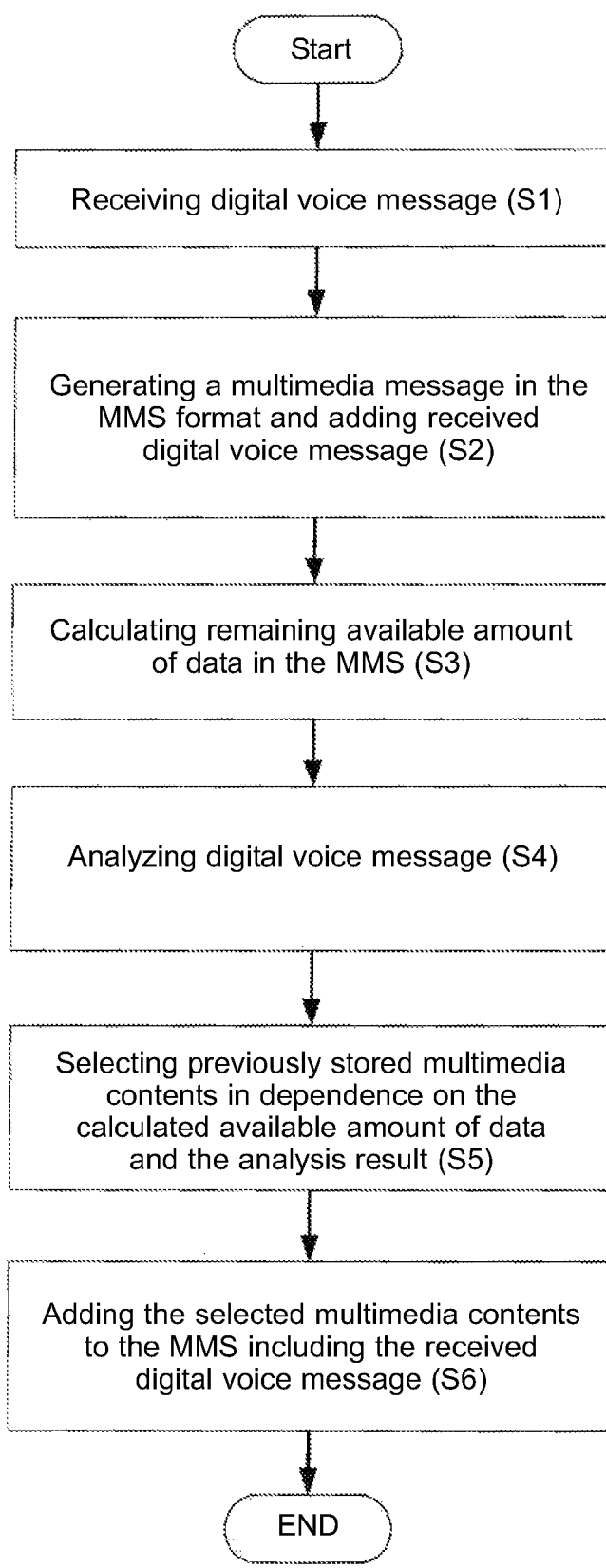
FIG. 1 shows a flow diagram representing the basic method in accordance with the present invention in a flow diagram.
Figure 2:
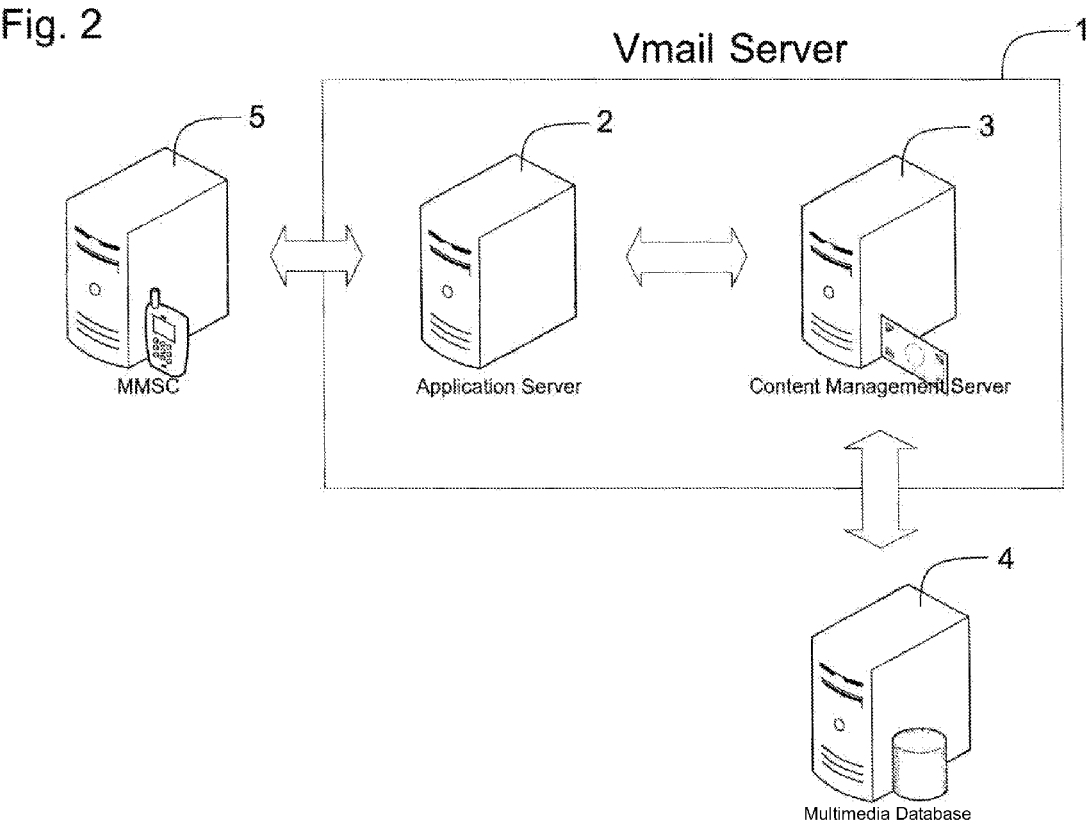
FIG. 2 shows an apparatus in accordance with the present invention which performs the method of FIG. 1.

In the following, preferred practical examples will be explained which are intended to illustrate the concept of the invention, without the invention being restricted thereto. At the outset, reference is made to FIGS. 1 and 2 illustrating a method and an apparatus in accordance with the present invention for intelligently composing different multimedia contents into a multimedia message for the digital answering service in a mobile radio system.

In Step S1 of the method of the invention, a digital voice message is received by an application server being part of a voice mail server, and is subsequently placed in a processing queue.

In a Step S2, a multimedia message is then generated in the application server in accordance with a template, and the received digital voice message is inserted in this multimedia message. This is done, for instance, by using the MMS format which is already implemented in third-generation mobile telephony.

In Step S3, the application server calculates the available amount of data remaining in the multimedia message that is available for additional, different multimedia content. For a multimedia message in the MMS format, the size is limited to 300 kB per MMS. The amount of data available apart from the actual digital voice message is calculated by subtracting the size of the voice message from these 300 kB.

In a Step S4, the digital voice message to be forwarded to the subscriber by MMS is then analyzed.

As will also be explained in more detail later on in connection with FIGS. 3 and 5, there are various possibilities for the analysis of Step S4 which may be employed both singly or also in combination.

One possibility is to determine the sender or recipient data and match them to user profiles already stored for the respective sender or recipient. A selection of profiles of multimedia contents stored in databases is then performed in accordance with the profile match.

By way of example, the user profile of the called person, which may be stored in a customer database of the mobil radio provider, contains his/her age, sex, rate of fees, mobile phone set model, place of residence, etc. The method of the invention may, e.g., integrate up-to-date messages relating to the called person's place of residence in the MMS and insert them in the display of the mobile telephone set while the voice mail contained in the MMS is being listened to. It would moreover be conceivable, e.g., to insert commercial offers relating to successor models of the mobile telephone set presently owned by the called person while the voice mail contained in the MMS is being listened to. It would then be possible to directly act on-line upon such offers via a WAP browser integrated in the mobile telephone set by means of a hyperlink, which would further enhance the user friendliness of the digital answering service.

These possibilities of utilizing the user profile are only available, however, if the mobil radio provider does have direct access to corresponding user databases and profiles. Such is, however, not always the case, particularly if hosted services are involved.

Another possibility of analyzing the digital voice message that is provided by the present invention consists in scanning the voice mails for keywords contained in them. In this case the received voice mail is analyzed in accordance with predetermined keywords by using speech recognition techniques (e.g., ASR), and the corresponding multimedia content associated with the determined keywords and stored in a database is selected and integrated into the MMS including the digital voice message.

In the case of such a keyword-based analysis of the voice mails, the method of the invention may then determine, for instance, the keyword "restaurant" in the voice message and insert a specific offer by a restaurant chain or a link to a restaurant guide in the internet which at the same time leads directly to the online offer in the internet via an integrated WAP browser.

If, in addition, the position of the mobile telephone set is known or can be determined, for instance with the aid of an integrated GPS function or by acquiring the HLR or VLR, it is also possible to insert a list of restaurants available in the vicinity of the mobile telephone set. It would also be conceivable to insert a weather report for the position of the mobile telephone set if, for instance, the analysis of the digital voice message yielded a keyword "weather", "rain", "sunshine", etc.

In a keyword analysis it is moreover not necessary to utilize the conventional automatic speech recognition in real time ("live ASR") which is usually employed in voice control and consumes a lot of computing resources and time, but it is advantageously possible to perform a file-based off-line speech recognition by providing a speech recognition server. This serves to save licensing fees and computing time and furthermore allows for a better recognition rate.

With the method of the invention described in the foregoing in connection with FIG. 1 it is possible for the mobil radio provider to utilize the free space remaining in the MMS for additional multimedia contents that might be of interest to the mobile telephone subscriber listening to his voice mail.

In this context it is obvious to the person having skill in the art that this basic concept of the present invention is not limited to the currently standardized MMS format but may also be employed in future mobile radio systems of the fourth and successive generations in order to achieve the same advantages as with the current MMS technology. The person having skill in the art is moreover aware that the various possibilities of analysis represented by way of example may be used both singly and in combination in the method of the invention. In addition, the additional possibility of including the position in the selection of multimedia contents to be integrated into the MMS offers an advantageous development of the method of the invention. On condition of appropriate presettings which may be carried out on the mobile telephone set by the user, it would then also be possible to update the firmware or other software of the mobile telephone conjointly with utilization of the digital answering service per MMS, without the user having to carry out separate inquiries in this regard; this might in turn enhance the user friendliness of the mobile telephone set and system.

In FIG. 2 a feasible apparatus for carrying out the method according to FIG. 1 is represented. This apparatus contains a voice mail server 1 which contains an application server 2 and a content management server 3 and which is connected to a multimedia content database 4 furnishing the previously stored multimedia contents, and to a multimedia message center MMSC 5 for receiving and transmitting MMS messages.

The servers may be provided as individual calculator units or, in turn, as integrated yet virtually (i.e., functionally) separate calculator units.

In the application server, the voice mail, or digital voice message, is received and inserted in an MMS-format multimedia message that was previously generated in the application server 2. The MMS voice mail is subsequently inserted in a list that is processed by the content management server 3 connected to the application server 2. The content management server 3 receives, or extracts, the MMS from the list and calculates the space remaining for additional multimedia content. In addition the content management server 3 analyzes the digital voice message, to then select the corresponding multimedia content from the connected multimedia content database 4 in dependence on the amount of data still available in the MMS and the analyzed voice message. The selected multimedia content is added to the MMS including the received digital voice message and sent to the recipient via the multimedia message center 5.

Figure 3:
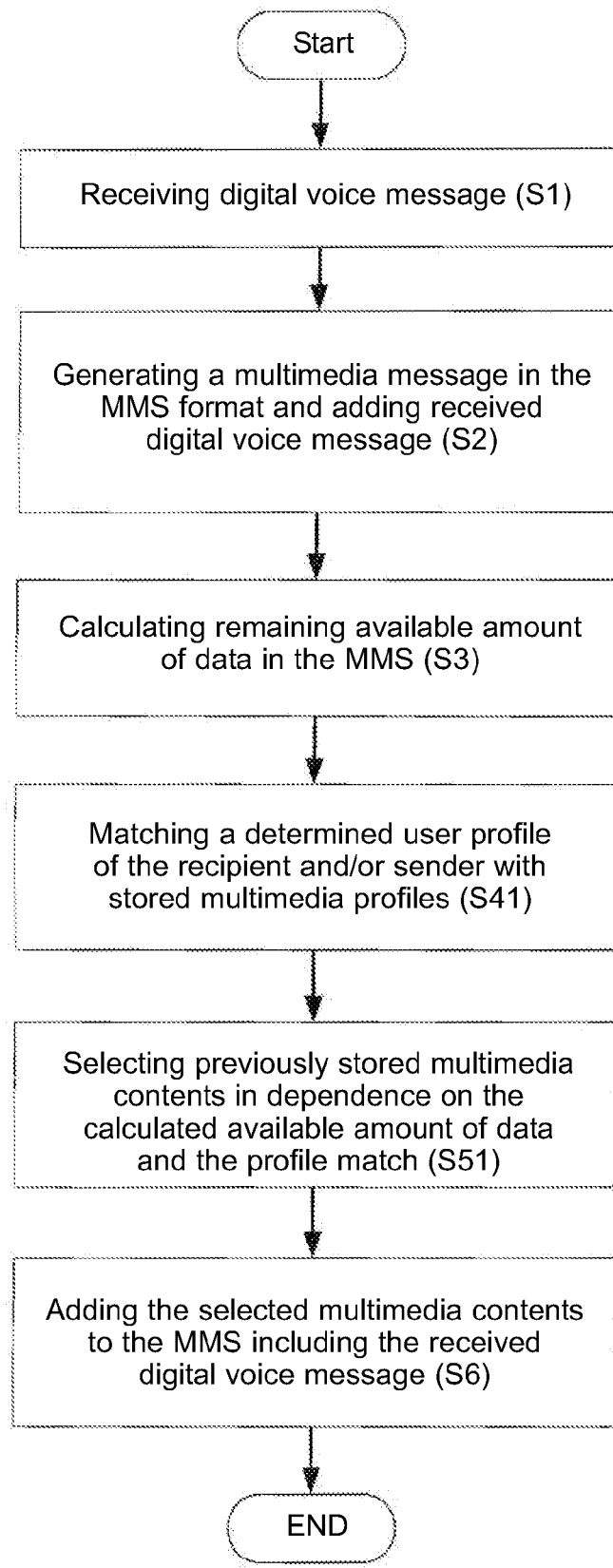
FIG. 3 shows a flow diagram representing an embodiment of the method in accordance with the present invention in a flow diagram.
Figure 4:
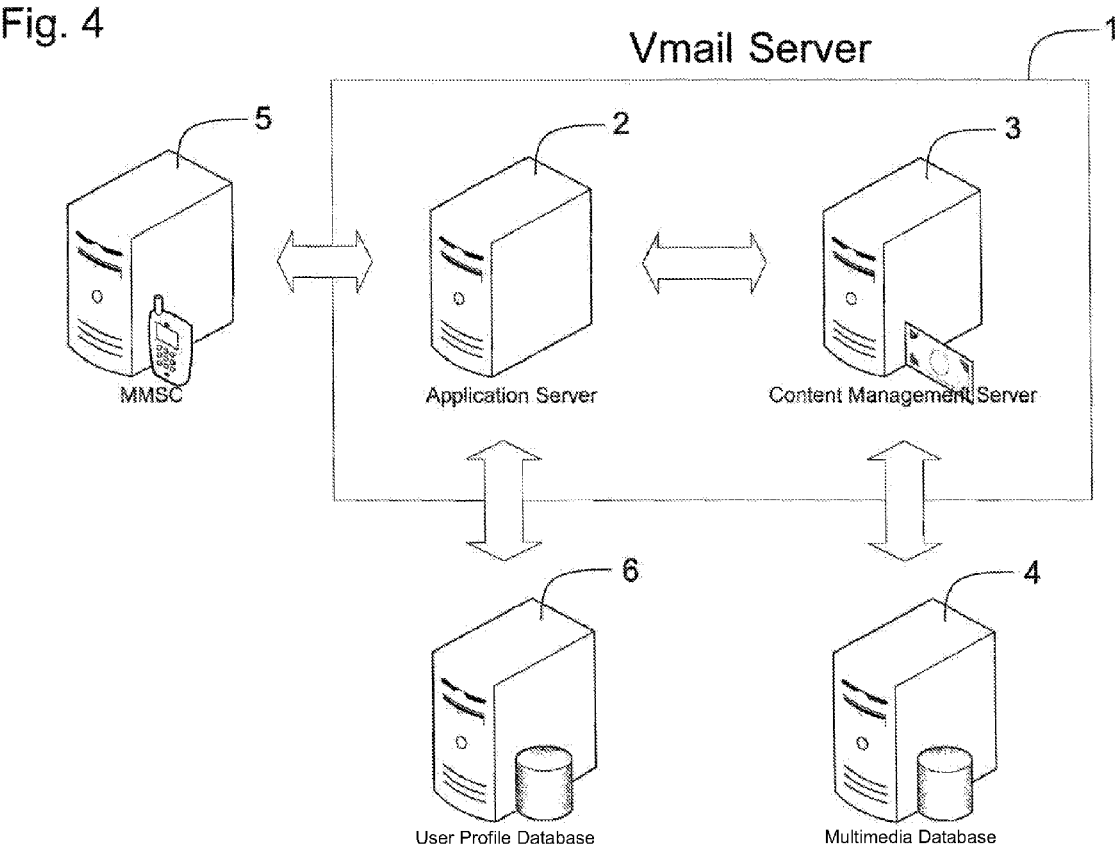
FIG. 4 shows a diagram representing an apparatus for carrying out the method shown in FIG. 3.
Figure 5:
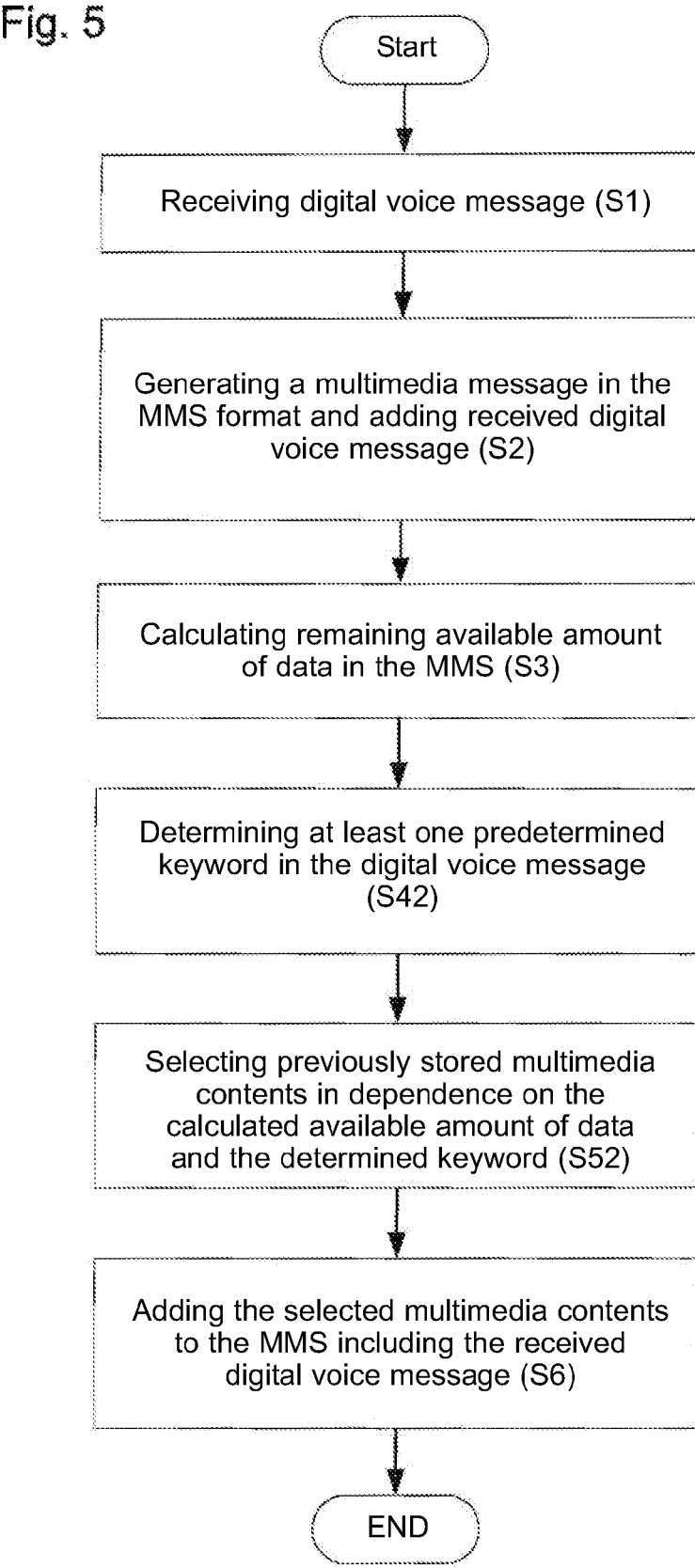
FIG. 5 shows a flow diagram representing a further embodiment of the method in accordance with the present invention in a flow diagram.
Figure 6:
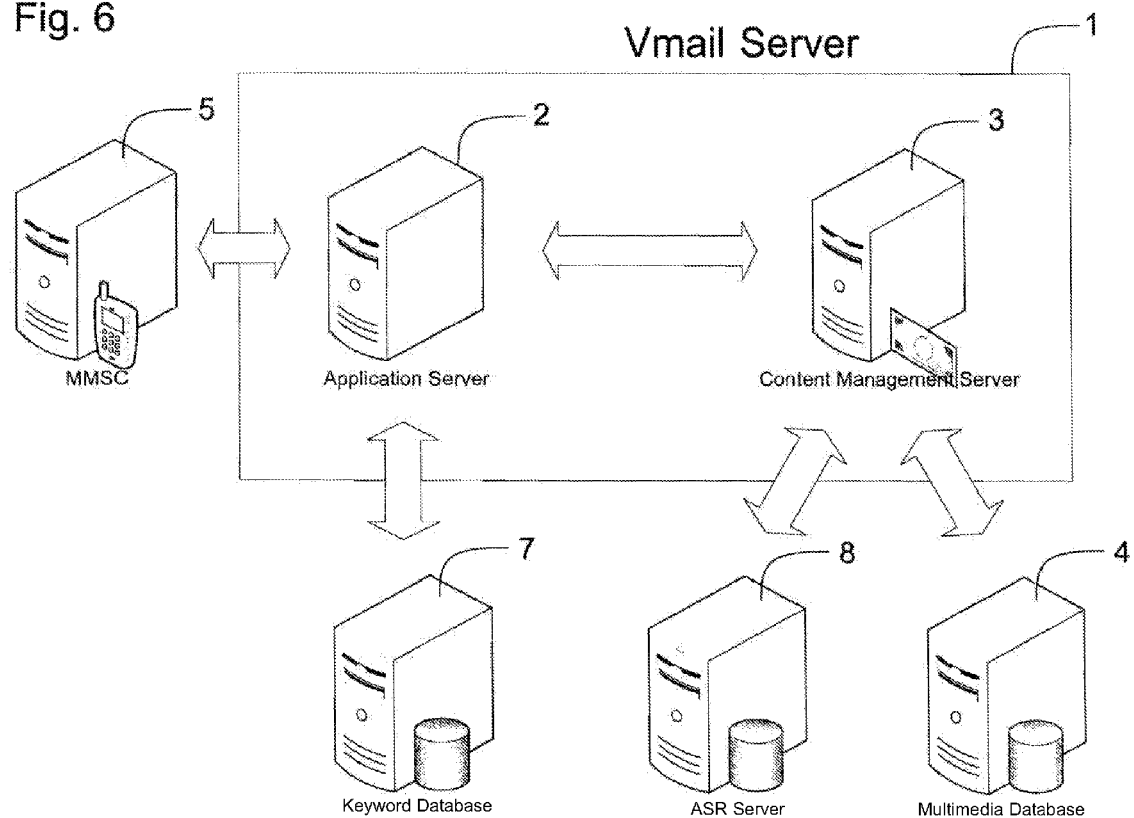
FIG. 6 shows a diagram representing an apparatus for carrying out the method shown in FIG. 5.

FIGS. 4 and 6 show respective modifications of the apparatus represented in FIG. 2 which enable the previously mentioned methods with the various possibilities of voice message analysis, as will be explained below in connection with FIGS. 3 and 5.

FIG. 4 shows a further embodiment of the apparatus of the invention in accordance with FIG. 2 for carrying out another embodiment in accordance with FIG. 3 of the method of the invention shown in FIG. 1.

The apparatus shown in FIG. 4 for intelligently composing a multimedia message to be transmitted in a mobile radio system, which allows matching a determined user profile of the recipient and/or sender to previously stored multimedia profiles, contains in addition to the elements of the apparatus of FIG. 2 a database 6 having user profiles stored therein, which is connected to the content management server 3. As an alternative, this database 6 may additionally or alternatively be connected to the application server.

In the method according to FIG. 3 a digital voice message, or voice mail, is initially received by the application server, just like in the case of the method according to FIG. 1. In a given case, the received voice mail may subsequently be converted into the AMR format for further processing. The application server 2 then selects an MMS template and inserts the received digital voice message in this MMS template. The voice mail is subsequently inserted in a processing list for further processing. The content management server 3 then extracts the generated MMS message of the digital voice message from this list and calculates the space that is available for additional multimedia content. This is determined on the basis of the predetermined upper limit for multimedia messages lying at 300 kB in the standardized MMS format, from which the size of the digital voice message in the AMR format is subtracted.

In addition the content management server 3 analyzes the digital voice message with regard to the sender or recipient and determines the associated user profiles that are stored in a database 6 together with customer data (S41). The content management server 3 then matches the determined user profiles to multimedia profiles stored in a multimedia database and selects the profiles presenting the best match. The content management server 3 thus obtains a list with possible multimedia content and selects from this a suitable multimedia content in dependence on the remaining available amount of data in the multimedia message (S51). The multimedia content thus selected is then inserted directly in the MMS including the digital voice message, to thereby compose a multimedia message which is sent via the multimedia message center 5 for forwarding to a mobile telephone subscriber.

FIG. 6 shows a further embodiment of the apparatus of the invention according to FIG. 2 for carrying out another embodiment according to FIG. 5 of the method of the invention as shown in FIG. 1.

In addition to the apparatus elements represented in FIG. 2, FIG. 6 further includes a keyword database 7 which is connected to the application server 2, as well as a server for automatic speech recognition—in the following: ASR server 8—which is connected to the content management server 3. As an alternative, or additionally, this ASR server 8 may also be connected to the application server 2.

Just like in the method according to FIG. 1, in the method according to FIG. 5 a digital voice message is initially received by the application server 2 and in a given case converted into an AMR format. Subsequently a blank multimedia message is generated, and the received digital voice message is inserted in this multimedia message. Thereupon the remaining available amount of data in the multimedia message is calculated.

The content management server 3 subsequently receives a list of keywords from the keyword database. The keywords thus received are made available to the ASR server 8 which scans the digital voice message for the predetermined keywords from the list. Subsequently the result of this scan is returned through the ASR server to the content management server 3 which then furnishes a list of multimedia content fitting these keywords (S42). The content management server 3 then selects a suitable multimedia content in dependence on the remaining available amount of data in the multimedia message and passes it on to the application server 2 (S52). The application server 2 then adds the selected multimedia contents to the multimedia message including the digital voice message, which is then sent via the multimedia message center 5 to the respective mobile telephony recipient.

If the ASR server is coupled with the application server 2 in accordance with the alternative arrangement mentioned in the foregoing, this does not substantially alter the manner of proceeding, although in this case the application server 2 previously has to load the keywords from the content management server 3 to then furnish them to the ASR server.

The present invention thus creates a method and an apparatus for intelligently composing a multimedia message for the mobile radio system. A selection is performed in dependence on the available space in the multimedia message and an analysis making use, e.g., of user profiles from customer databases, or a keyword analysis with the aid of speech recognition (in real time or off-line), so that a user of the digital answering service may assimilate visual or audio-visual multimedia content of interest in parallel with listening to his/her digital voice message.

In advantageous developments of the present invention it is moreover possible to combine the possibilities of analyzing the received voice mails that were mentioned by way of example.

Further advantageous embodiments of the present invention may additionally also account for the current position as well as the mobile telephone set model in the selection of suitable multimedia contents.

The invention claimed is:

1. A method for intelligently composing a multimedia message in standardized Multimedia Service (MMS) format for a mobile radio system, including the following steps:
    receiving a digital voice message from a digital answering service;
    generating a blank multimedia message in MMS format;
    creating a modified MMS-format multimedia message by adding the received digital voice message to the blank MMS-format multimedia message;
    calculating the remaining available amount of data in the modified MMS-format multimedia message by subtracting the size of the digital voice mail from the size of the blank MMS-format multimedia message;
    analyzing the digital voice message;

selecting stored multimedia contents in dependence on the calculated remaining available amount of data in the modified MMS-format multimedia message, the analysis result, and a position of a mobile radio set; and adding the selected multimedia contents to the modified MMS-format multimedia message including the received digital voice message.

2. The method for intelligently composing a multimedia message for a mobile radio system according to claim 1, wherein the step of analyzing the digital voice message further includes matching a determined user profile of the recipient and/or sender to stored multimedia profiles.

3. The method for intelligently composing a multimedia message for a mobile radio system according to claim 1, wherein the step of analyzing the digital voice message further includes determining at least one predetermined keyword in the digital voice message.

4. The method for intelligently composing a multimedia message for a mobile radio system according to claim 3, wherein the determination of the at least one keyword furthermore takes place by means of automatic speech recognition.

5. The method for intelligently composing a multimedia message for a mobile radio system according to claim 3, wherein the automatic speech recognition furthermore takes place in real time.

6. The method for intelligently composing a multimedia message for a mobile radio system according to claim 3, wherein the automatic speech recognition furthermore takes place off-line.

7. An apparatus for intelligently composing a multimedia message in a standardized Multimedia Messaging Service (MMS) format for a mobile radio system, comprising:

means for receiving a digital voice message from a digital answering service;

means for generating a blank multimedia message in MMS format;

means for creating a modified MMS-format multimedia message by adding a received digital voice message to the blank MMS-format multimedia message;

means for calculating the remaining available amount of data in the modified MMS-format multimedia message by subtracting the size of the digital voice mail from the size of the blank MMS-format multimedia message;

means for analyzing the digital voice message;

means for selecting stored multimedia contents in dependence on the remaining available amount of data in the modified MMS-format multimedia message, the analysis result, and a position of a mobile radio set;

means for adding the selected multimedia contents to the modified MMS-format multimedia message including the received digital voice message.

8. The apparatus for intelligently composing a multimedia message for a mobile radio system according to claim 7, wherein the means for analyzing further comprise means that are configured to provide a match of a determined user profile of the recipient and/or sender with stored multimedia profiles.

9. The apparatus for intelligently composing a multimedia message for a mobile radio system according to claim 7, wherein the means for analyzing further comprise means that are configured to provide the determination of at least one predetermined keyword in the digital voice message.

10. The apparatus for intelligently composing a multimedia message for a mobile radio system according to claim 9, wherein the means for determining the at least one keyword are configured such that the determination of the at least one keywords takes place by means of automatic speech recognition.

11. The apparatus for intelligently composing a multimedia message for a mobile radio system according to claim 9, wherein the means for determining the at least one keyword are configured such that the automatic speech recognition takes place in real time.

12. The apparatus for intelligently composing a multimedia message for a mobile radio system according to claim 9, wherein the means for determining the at least one keyword are configured such that the automatic speech recognition takes place off-line.

\* \* \* \* \*